United States Patent
Burkhardt et al.

(10) Patent No.: US 7,964,168 B2
(45) Date of Patent: Jun. 21, 2011

(54) $CO_2$ CAPTURE METHOD WITH THERMAL INTEGRATION OF REGENERATOR

(75) Inventors: Thorsten Burkhardt, Munich (DE); Pierre-Antoine Bouillon, Lyons (FR); Jean-Claude Magdelenat, Belfort (FR)

(73) Assignees: IFP, Cedex (FR); ALSTOM Technology Ltd., Belfort (FR)

( * ) Notice: Subject to any disclaimer, the term of this patent is extended or adjusted under 35 U.S.C. 154(b) by 188 days.

(21) Appl. No.: 11/869,786

(22) Filed: Oct. 10, 2007

(65) Prior Publication Data

US 2009/0098035 A1  Apr. 16, 2009

(30) Foreign Application Priority Data

Nov. 11, 2006  (FR) ..................................... 06 08971

(51) Int. Cl.
*B01D 19/00* (2006.01)
*B01D 53/14* (2006.01)

(52) U.S. Cl. .............. 423/220; 502/34; 502/55; 96/156; 96/159; 96/165; 96/166; 96/168

(58) Field of Classification Search .................. 423/210, 423/220, 226, 228
See application file for complete search history.

(56) References Cited

U.S. PATENT DOCUMENTS

| | | | |
|---|---|---|---|
| 4,035,166 A | | 7/1977 | Van Hecke |
| 4,367,258 A | * | 1/1983 | Lagana et al. ................ 423/228 |
| 4,522,638 A | | 6/1985 | Karwat |
| 4,608,068 A | * | 8/1986 | Bauer et al. ..................... 62/623 |
| 6,372,023 B1 | * | 4/2002 | Kiyono et al. ................. 95/228 |
| 2004/0057886 A1 | * | 3/2004 | Paulsen et al. ................ 423/220 |

FOREIGN PATENT DOCUMENTS

| | | |
|---|---|---|
| EP | 0738536 | 10/1996 |
| FR | 2760653 | 9/1998 |
| FR | 2848121 | 6/2004 |
| GB | 2 062 597 A | 5/1981 |
| WO | WO 98/04339 | 2/1998 |
| WO | WO 00/48709 | 8/2000 |

OTHER PUBLICATIONS

Perry's Chemical Engineers' Handbook, 7th Edition. Perry, R.H.; Green, D.W. © 1997 McGraw-Hill.*

* cited by examiner

*Primary Examiner* — Jerry Lorengo
*Assistant Examiner* — Jared Wood
(74) *Attorney, Agent, or Firm* — Antonelli, Terry, Stout & Kraus, LLP.

(57) ABSTRACT

The $CO_2$ contained in combustion fumes is captured by carrying out at least the following steps in combination:
a) a fuel is burned, producing combustion fumes;
b) the fumes are placed in contact with an absorbent solution in order to produce $CO_2$-poor fumes and a $CO_2$-laden solution;
c) the $CO_2$-laden solution is regenerated in a thermal regeneration column (RE) in order to produce a regenerated absorbent solution and a $CO_2$-rich gaseous effluent (5); and
d) the $CO_2$-rich gaseous effluent is cooled in order to obtain a $CO_2$-enriched gaseous fraction which is evacuated, and a liquid fraction, which is heated by heat exchanged with the combustion fumes and then introduced at the head of regeneration column (RE) as reflux (7).

11 Claims, 8 Drawing Sheets

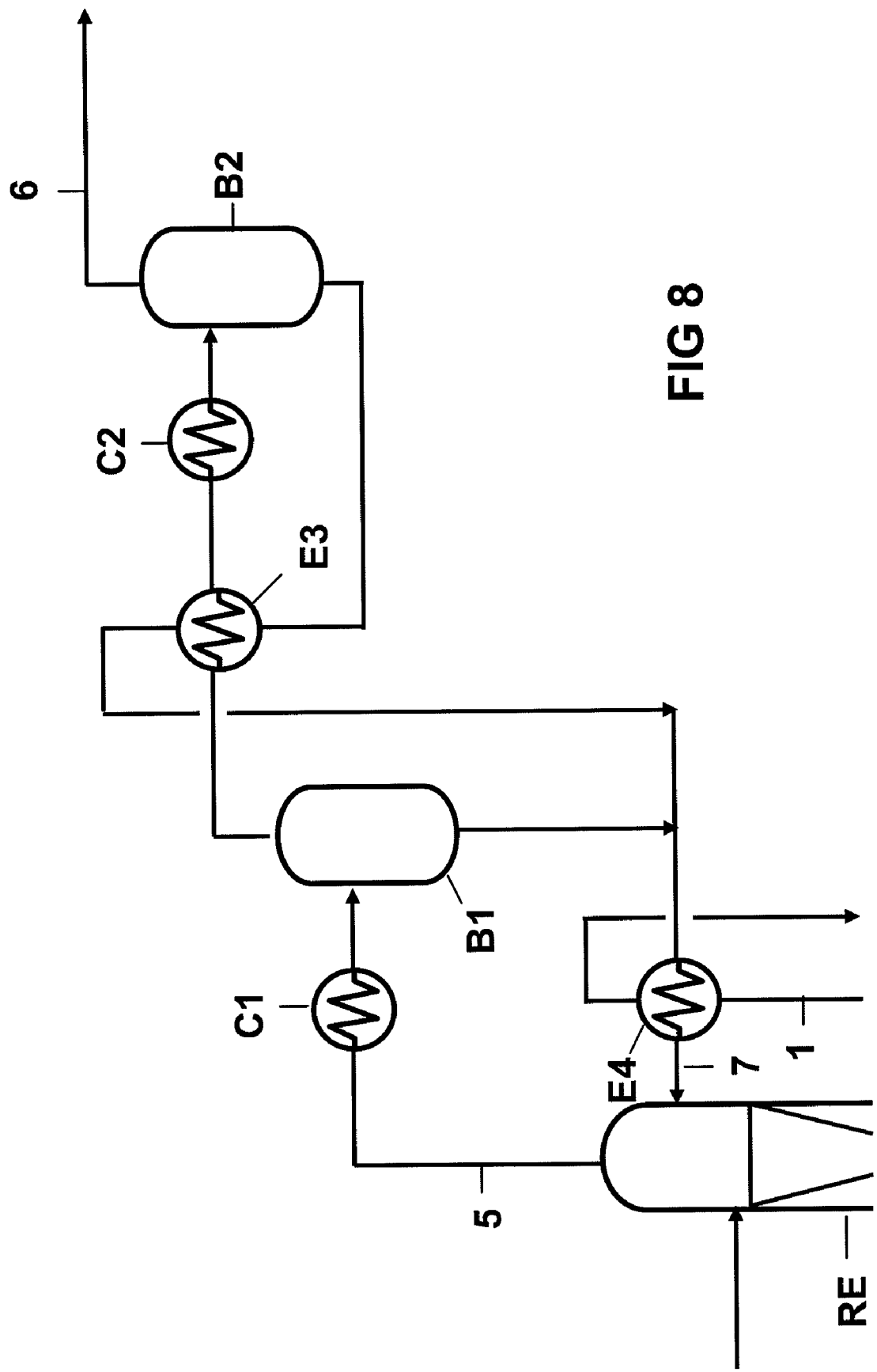

$CO_2$ CAPTURE METHOD WITH THERMAL INTEGRATION OF REGENERATOR

The present invention relates to the field of decarbonation of a gaseous effluent by means of an absorbent solution.

The method shown schematically in FIG. 1 and described in detail hereinbelow represents a method for extracting the carbon dioxide ($CO_2$) contained in combustion fumes. This method employs a solution that absorbs $CO_2$.

Regeneration of the absorbent solution is generally accomplished by bringing the solution into contact with steam. The thermal energy needed for regeneration vaporizes the water in order to break the energy bond between the absorbed $CO_2$ and the absorbing solution and to evacuate the $CO_2$ by steam entrainment. This regeneration of the $CO_2$-laden absorbent solution is expensive from the standpoint of energy consumption.

Also, the reflux generated by partial condensation of the gaseous effluent obtained at the head of the regeneration column enables the vaporized water to be recovered. It is useful to cool the effluent at the column head to a relatively low temperature in order, first, to maximize the amount of water recycled in the column and, second, to produce a water-impoverished flow of $CO_2$. This is because the more water is recycled in the column, the more effective is regeneration. Moreover, the fact that the $CO_2$ flow is water-impoverished enables subsequent treatments such as compression or liquefaction to be accomplished with no problems. However, the fact of cooling to a relatively low temperature generates a reflux at low temperatures which requires additional calories to be supplied by the reboiler in the regeneration column.

This energy consumption by the regeneration column is a major drawback because, if the heat needed to regenerate the absorbent solution is obtained by burning a fossil fuel, an additional amount of $CO_2$ may be produced, which would greatly detract from the usefulness of extracting $CO_2$ from the fumes to be treated.

The present invention proposes to cool the effluent at the regeneration column head to a relatively low temperature, for example about 10° C. to 50° C., while minimizing the energy supply required for proper operation of the absorbent solution regeneration in order to obtain not only a $CO_2$-rich and water-poor flow but also a sufficiently large liquid reflux for proper operation of the regeneration column. To achieve this goal, the invention proposes increasing the temperature of the reflux introduced at the regeneration column head, using various means.

In general, the invention relates to a method of capturing the $CO_2$ contained in combustion fumes wherein the following steps are carried out in combination:
a) A fuel is burned, producing combustion fumes;
b) The fumes are placed in contact with an absorbent solution in order to produce $CO_2$-poor fumes and a $CO_2$-laden solution;
c) The $CO_2$-laden solution is regenerated in a thermal regeneration column in order to produce a regenerated absorbent solution and a $CO_2$-rich gaseous effluent;
d) Said $CO_2$-rich gaseous effluent is cooled in order to obtain a $CO_2$-enriched gaseous fraction which is evacuated, and a liquid fraction which is introduced at the head of regeneration column as reflux.

The method according to the invention is characterized in that, in step d), at least one of the following operations is conducted:
i) Said gaseous effluent is cooled to an intermediate temperature in order to produce a liquid flow and a gaseous flow, then the gaseous flow is subcooled in order to produce said gaseous fraction and said liquid fraction, said liquid flow and said liquid fraction being reassembled then introduced at the head of the regeneration column as reflux;
ii) Said liquid fraction is heated by heat exchange with said gaseous effluent;
iii) Said liquid fraction or said liquid flow is heated by heat exchange with said combustion fumes.

According to the invention, in step d), said gaseous effluent can be cooled to a temperature between 10° C. and 50° C. Alternatively, in step i), said gaseous effluent can be cooled to the intermediate temperature between 40° C. and 80° C. and the gaseous flow can be subcooled to a temperature between 10° C. and 50° C.

Heat can be supplied at the bottom of the regeneration column by a reboiler.

The absorbent solution can include water and amines.

Before step b), the combustion fumes can be cooled by indirect heat exchange with seawater.

The combustion fumes can be produced by a thermal electricity generating plant, a steel blast furnace, a cement kiln, or a glass kiln.

Other features and advantages of the invention will be better understood and will appear clearly from reading the description hereinbelow with reference to the drawings:

FIGS. 2 to 8 show various embodiments of the invention.

Figure 1:
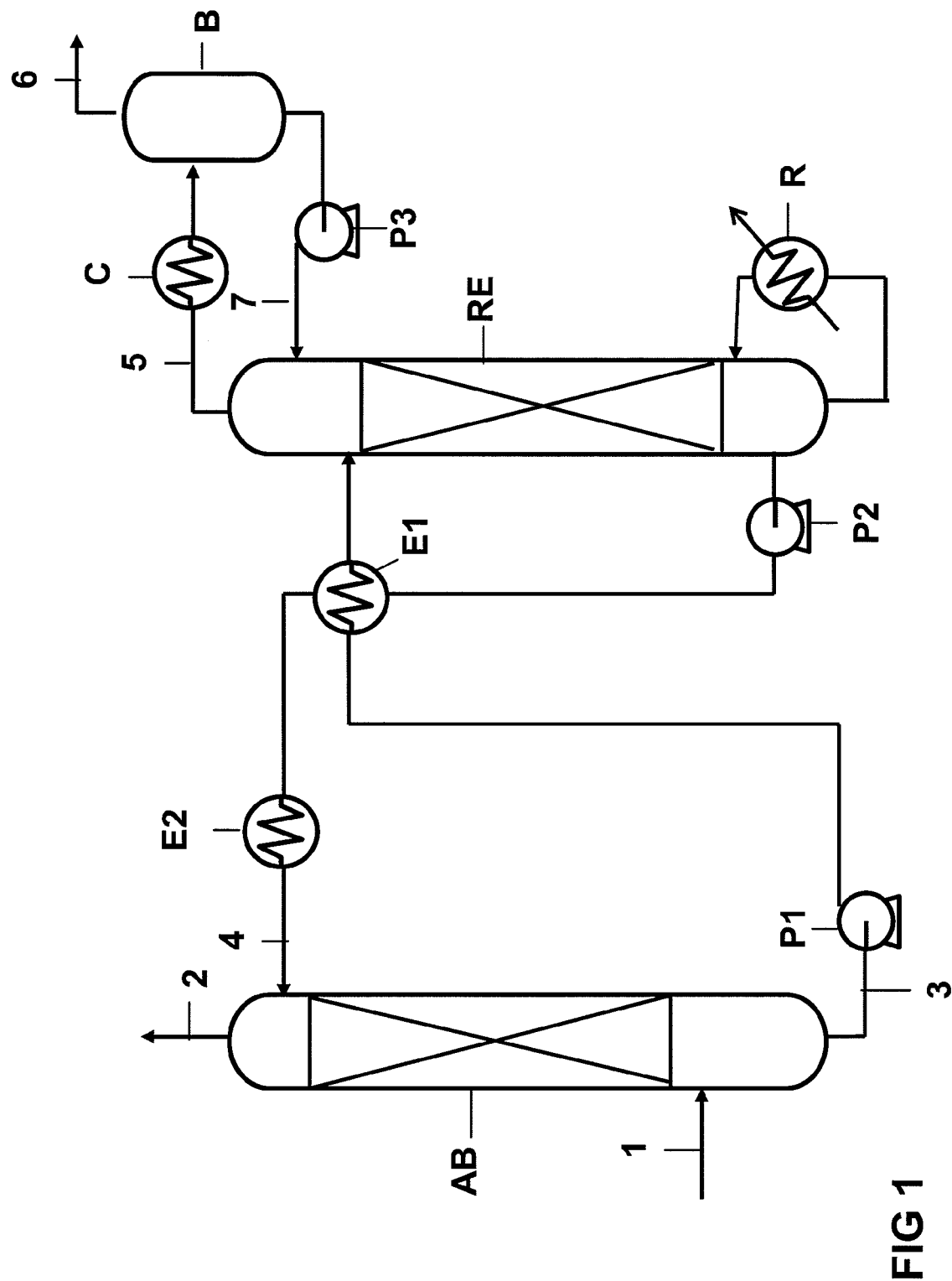
FIG. 1 shows a method of capturing the $CO_2$ contained in fumes.

In FIG. 1, the combustion fumes arriving via line 1 are introduced into absorption column AB to be brought into contact with the absorbent solution arriving via line 4. In AB, the solution absorbs the $CO_2$ contained in the combustion fumes. The $CO_2$-laden absorbent solution is evacuated at the bottom of column AB via line 3. The $CO_2$-poor fumes are evacuated at the head of column AB via line 2.

The absorbent solution can be chemical, i.e. involving a chemical reaction with the $CO_2$ upon absorption. In this case, the absorbent solution can include alkanolamines, for example MEA (methylethanolamine), DEA (diethanolamine), MDEA (dimethylethanolamine), DIPA (diisopropylamine), DGA (diglycolamine), diamines, piperazine, and/or hydroxyethyl piperazine. The absorbent solution can act by physical absorption, i.e. by physical affinity between the solution and the $CO_2$. In this case, the solution may contain, for example, sulfolane, methanol, N-formyl morpholine, acetyl morpholine, propylene carbonate, dimethyl ether polyethylene glycol, or N-methylpyrrolidone.

The combustion fumes may come from an electricity generating plant using a fossil fuel, a steel blast furnace, a cement or glass kiln, etc. The typical composition of a combustion fume produced by a coal-fired electricity generating plant is 75% nitrogen, 15% $CO_2$, 5% oxygen, and 5% water. In general, the $CO_2$ level of a combustion fume can range from 3% to 10%. The temperature of these fumes can be between 20° C. and 250° C. The pressure can range from 1 to 40 bars absolute.

Column AB can be any type of equipment that brings together a gas and a liquid. For example, AB can be a plate column, a packed column with structured or random packing, a pulsed column, or a series of mixers and decanters.

Before introduction into AB, the temperature and pressure of the combustion fumes can be modified in order to effect absorption under the most advantageous conditions. For example, the combustion fumes can be cooled by indirect heat exchange with seawater.

The $CO_2$-laden solution evacuated from AB via line 3 is taken up by pump P1, and heated in indirect heat exchanger E1, i.e. there is an exchange of heat between two fluids with no transfer of material. The heated solution is then introduced into regeneration column RE.

The regeneration column separates the $CO_2$ from the absorbent solution. The reboiler R at the bottom of column RE vaporizes the water in order to break the energy bond between the absorbed $CO_2$ and the absorbent solution, and to evacuate the absorbent solution by a $CO_2$ entrainment effect. The regenerated absorbent solution, i.e. $CO_2$-poor absorbent solution, is evacuated at the bottom of RE. A gaseous effluent containing the $CO_2$ released in gaseous form in RE is evacuated at the head of column RE via line 5. This gaseous effluent additionally contains water and possibly traces of other compounds.

The regenerated absorbent solution evacuated at the bottom of RE is taken up by pump P2, passes through heat exchangers E1 and E2, and is then reintroduced into column AB through line 4. In exchanger E1, the regenerated absorbent solution heats up the $CO_2$-laden absorbent solution coming from the bottom of AB. Exchanger E2 modifies, generally by cooling, the temperature of the regenerated absorbent solution before introduction into AB.

The gaseous effluent evacuated through line 5 is introduced into condenser C, i.e. an indirect heat exchanger using a coolant, to be cooled until the water contained in the effluent partially condenses. The partially condensed effluent is introduced into separation tank B. The $CO_2$-rich gaseous fraction coming from the head of B is evacuated through line 6. The liquid fraction obtained at the bottom of tank B is pumped by pump P3 then reinjected at the head of RE through line 7 as a reflux. This liquid fraction comprises mainly water, for example 95 vol. %, traces of $CO_2$, and possibly traces of absorbent solution.

According to the invention, the process described with reference to FIG. 1 is operated such as to produce, via line 6, a gaseous fraction rich in $CO_2$, for example having more than 90 vol. % $CO_2$, preferably 95% or even 98%. This is because subsequent treatments such as compression, liquefaction, or transportation of this $CO_2$-rich fraction require a high $CO_2$ concentration and the cost of $CO_2$ treatment is reduced by limiting the presence of impurities. To obtain a high $CO_2$ concentration, the gaseous effluent obtained at the head of RE is cooled to a relatively low temperature, for example between 10° C. and 50° C., preferably between 15° C. and 40° C. The water condensed by cooling is used as reflux in the regeneration column. Hence, cooling requires a greater heat input at R. To minimize the heat input at R, the present invention proposes increasing the reflux temperature at the head of column RE while bringing about low-temperature cooling of the effluent produced at the head of RE, particularly by implementing one of the provisions illustrated in FIGS. 2 to 8. It is possible to increase the reflux temperature which generally involves over 95% water without vaporizing the reflux water. This is because the cooling temperature is generally well below the bubble point temperature of water at the water partial pressure considered.

FIGS. 2 to 8 show a number of ways of producing the reflux at the head of column RE. In FIGS. 2 to 8, the numerals identical to those in FIG. 1 designate the same elements.

According to the invention, a $CO_2$ capture method according to FIG. 1 integrating at least one of the options described with reference to FIGS. 2 to 8 is implemented.

Figure 2:
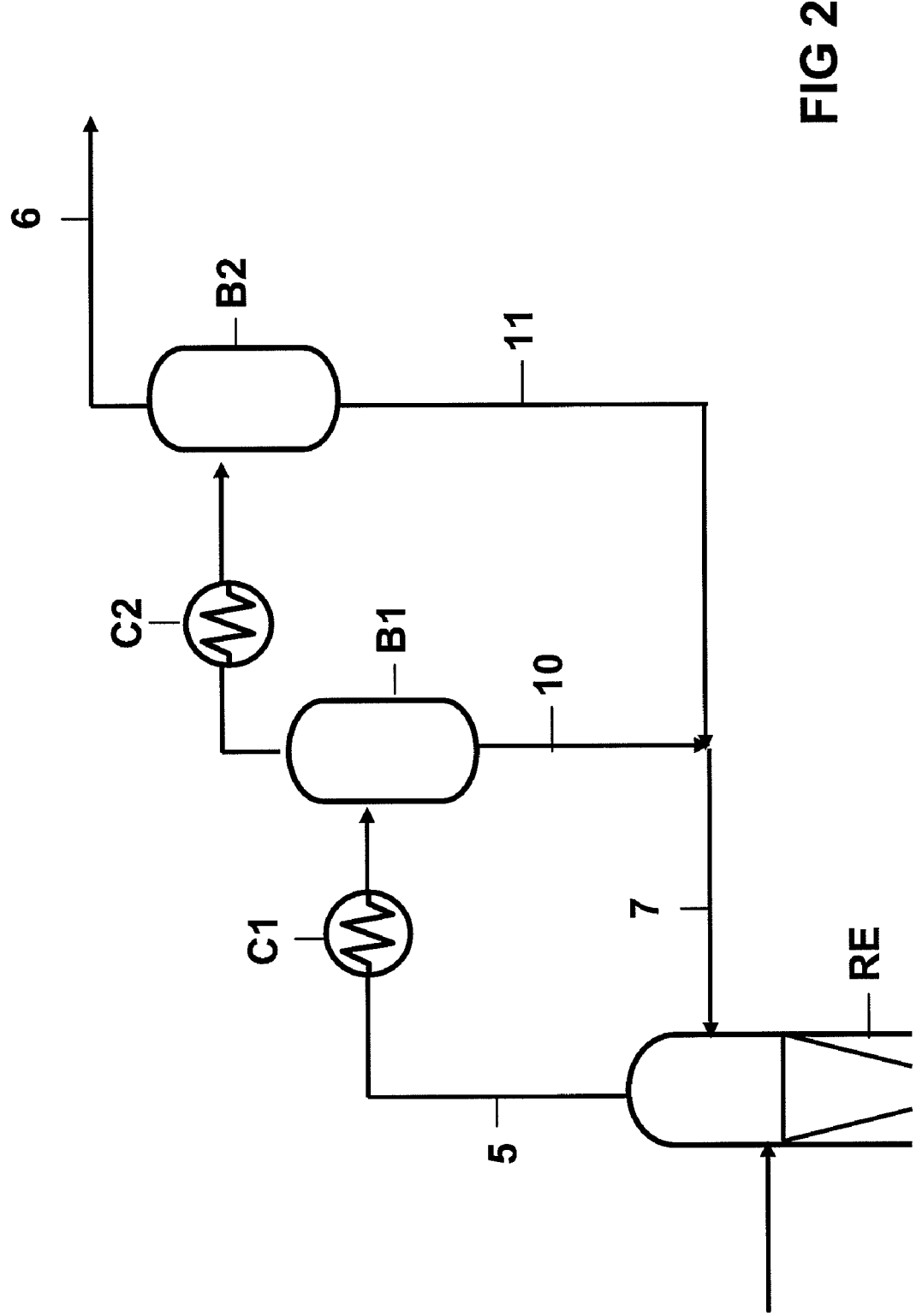

With reference to FIG. 2, the gaseous effluent coming from the head of the regeneration column through line 5 is cooled to an intermediate temperature in heat exchanger C1 in order to condense some of the water contained in the effluent. For example, the intermediate temperature is between 40° C. and 80° C. Then, the effluent is introduced into separation tank B1 to separate the condensate from the gaseous fraction. The gaseous fraction obtained at the head of B1 is cooled by heat exchange in exchanger C2 so that it is partially condensed at a final temperature, and is then introduced into separation tank B2. The gaseous fraction obtained at the head of B2 constitutes the $CO_2$-rich flow evacuated via line 6. The condensates evacuated by lines 10 and 11 from tanks B1 and B2 respectively are reintroduced through line 7 into column RE as reflux. Thus, the fact of producing a portion of the reflux in tank B1 at an intermediate temperature higher than the final temperature leads to obtaining a hotter reflux by comparison to the classical solution in which all the effluent is cooled to the final temperature. Hence, the energy supplied by reboiler R is lower because the reflux temperature is higher (less heat is needed to vaporize the water contained in the reflux). Implementation of the system in FIG. 2 economizes on the energy consumption of reboiler R with no additional energy input. The capture method according to the invention is more energy-saving than the prior art methods.

FIG. 2 represents a case with cooling in two steps. Without departing from the framework of the invention, cooling in three or more than three steps can be envisaged.

Figure 3:
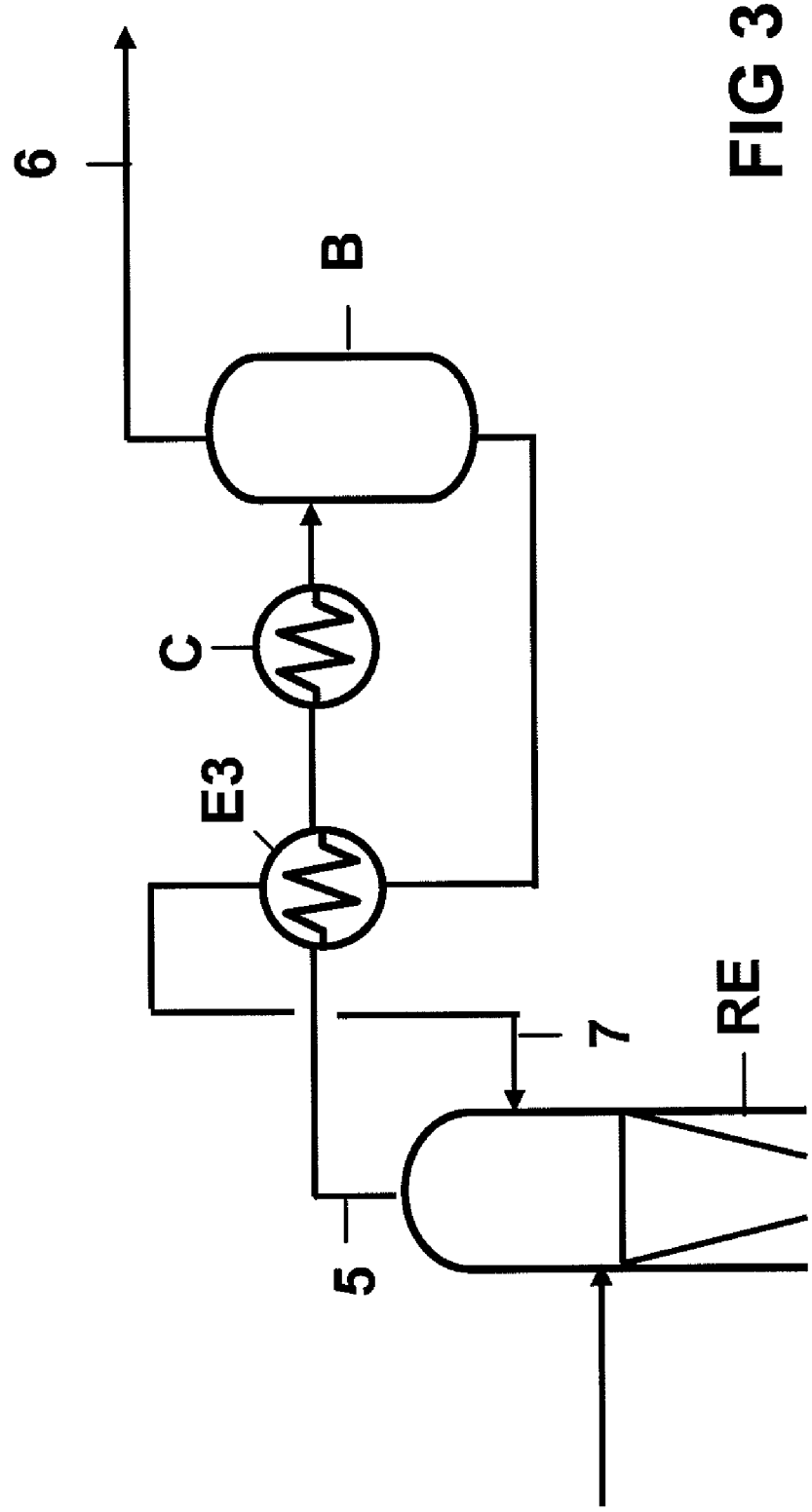

With reference to FIG. 3, the gaseous effluent produced at the head of column RE is introduced via line 5 into heat exchanger E3 to be cooled, then into condenser C to be subcooled to the point of partial condensation. In tank B, the gaseous fraction is separated from the liquid fraction. The gaseous fraction is evacuated through line 6. The liquid fraction is introduced into head exchanger E3 before being introduced into regeneration column RE as reflux. In exchanger E3, the reflux introduced into RE is heated by indirect heat exchange with the effluent coming from the head of RE. This not only saves the energy for cooling the effluent coming from the head of RE but also saves energy at reboiler RE because the reflux is heated in E3 before introduction into RE. Implementation of the system of FIG. 3 saves on the energy consumption of reboiler R and condenser C with no additional energy input. The capture method according to the invention is more energy-saving than the prior art methods.

Figure 4:
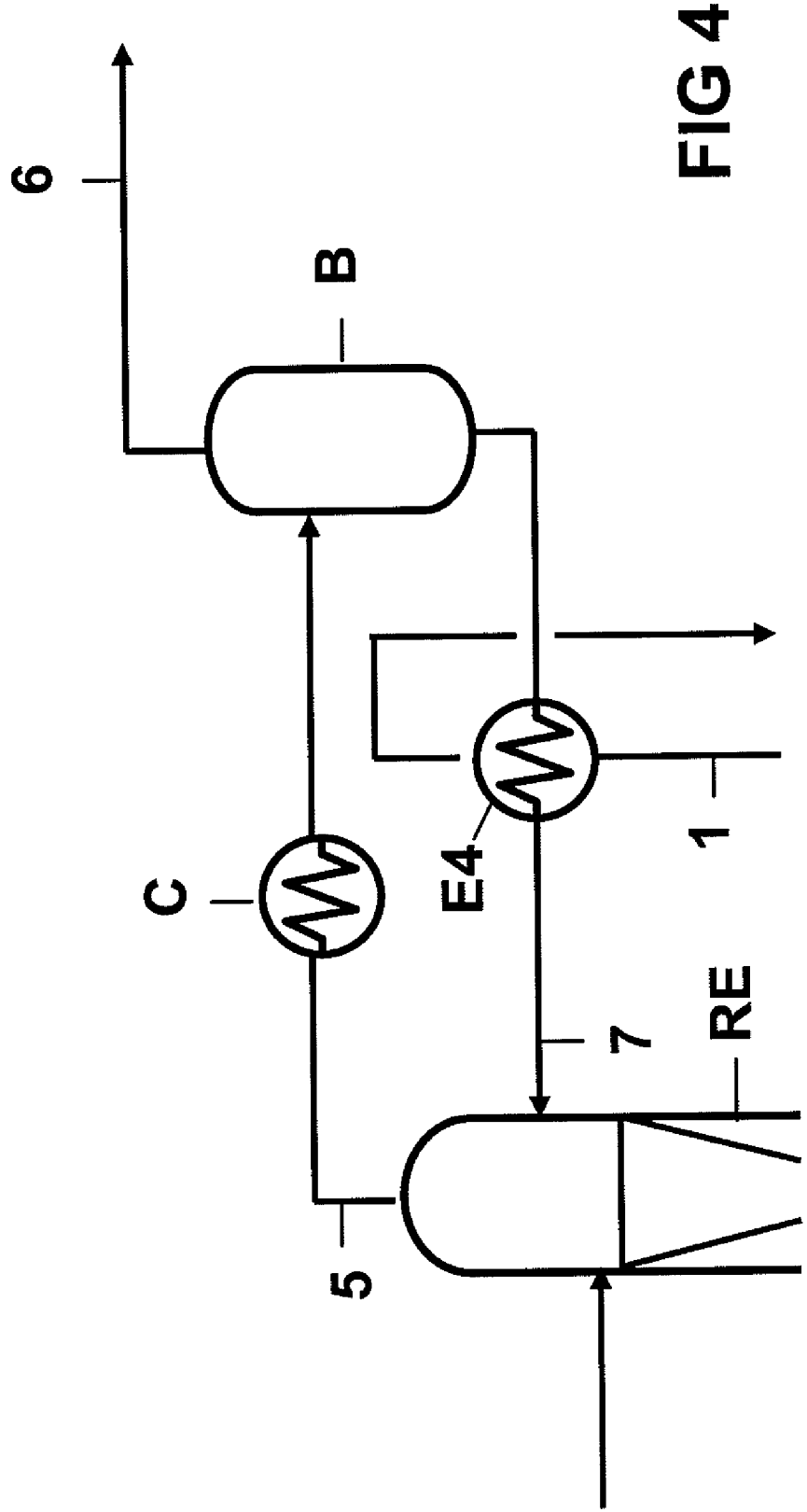

With reference to FIG. 4, the effluent produced at the head of column RE is partially condensed by heat exchange in C, and is then divided into a liquid fraction and a gaseous fraction in B. The gaseous fraction is evacuated from B via line 6. The liquid fraction coming from B is heated in exchanger E4 by indirect heat exchange with the combustion fumes arriving via line 1. The heated liquid fraction is then introduced via line 7 into column RE as reflux. After passage into E4, the cooled combustion fumes are introduced into the absorption column. This solution is attractive when the combustion fumes are at a higher temperature than the temperature of the liquid fraction evacuated at the bottom of B. Hence, the energy supplied by reboiler R is lower since the reflux temperature is higher and $CO_2$ absorption in AB is favored by the temperature drop of the fumes as they enter AB. Implementation of the system in FIG. 4 economizes on the energy consumption of reboiler R and of condenser C with no other additional energy. The capture method according to the invention is more energy-saving than the prior art methods.

Moreover, the method diagramed in FIG. 4 lowers the fume temperature, which improves $CO_2$ absorption by the absorbent solution.

Figure 5:
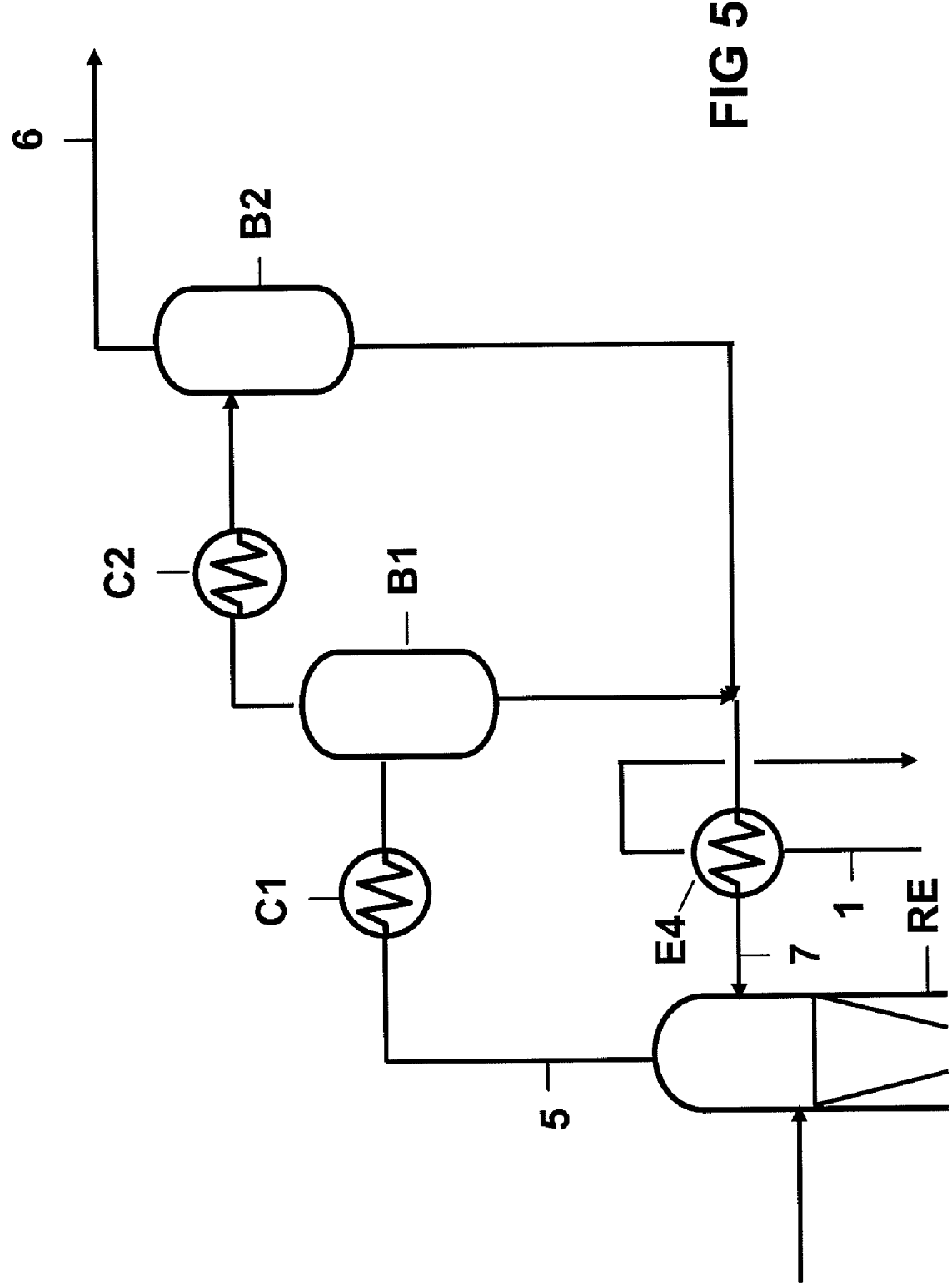

FIG. 5 proposes to combine the two embodiments described with reference to FIGS. 2 and 4.

With reference to FIG. 5, the gaseous effluent obtained at the head of RE is cooled to an intermediate temperature in C1, and the condensates produced by this cooling are recovered at the bottom of B1. The gaseous fraction evacuated at the head of B1 is cooled to a final temperature by C2, and the condensates produced by this second cooling are recovered at the bottom of B2. The condensates are reassembled, heated in E4 by heat exchange with the combustion fumes arriving via line 1, then introduced into column RE as reflux. The gaseous fraction obtained at the head of B2 constitutes the $CO_2$-rich flow evacuated by line 6.

Figure 6:
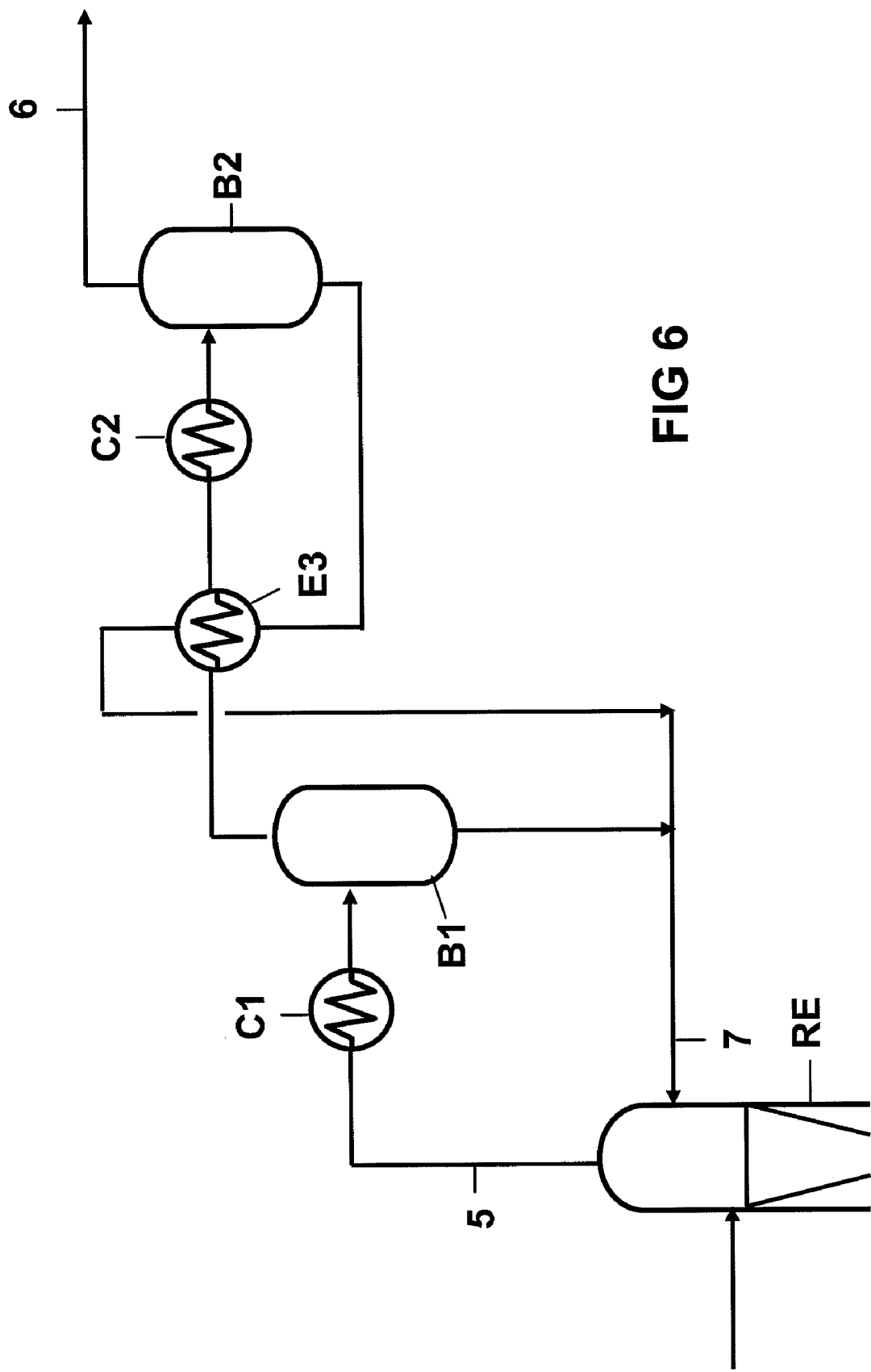

FIG. 6 proposes to combine the two embodiments described with reference to FIGS. 2 and 3.

With reference to FIG. 6, the gaseous effluent obtained at the head of RE is cooled to an intermediate temperature in C1, and the condensates produced by this cooling are recovered at the bottom of B1. The gaseous fraction evacuated at the head of B2 is cooled to a final temperature by E3 and C2, and the condensates produced by this second cooling are recovered at the bottom of B2. The condensates recovered at the bottom of B2 are heated in E3 by indirect heat exchange with the gaseous fraction produced at the head of B1. Alternatively, the condensates recovered at the bottom of B2 can be heated by indirect heat exchange with the effluent evacuated at the head of RE by line 5. These heated condensates are then combined with the condensates recovered at the bottom of B1 in order to be reintroduced into column RE as reflux via line 7. The gaseous fraction obtained at the head of B2 constitutes the $CO_2$-rich flow evacuated by line 6.

Figure 7:
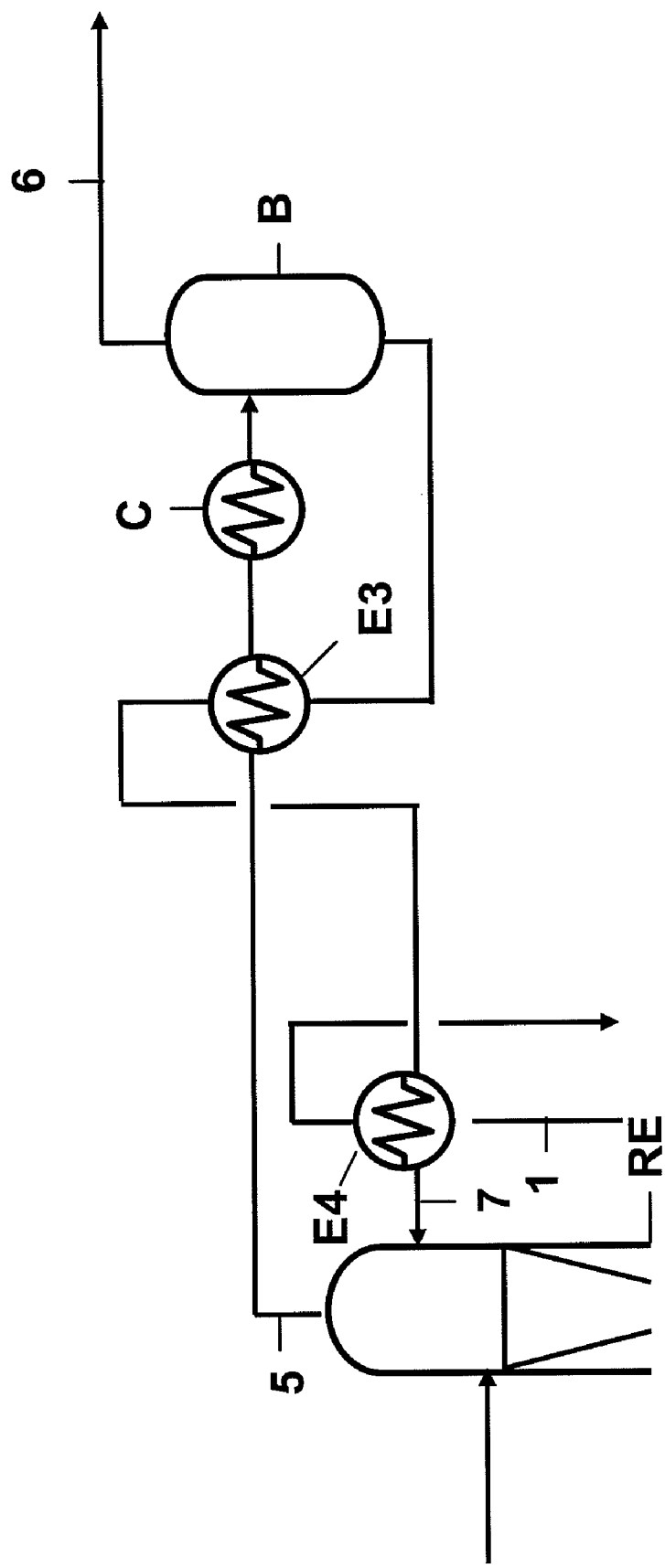

FIG. 7 proposes to combine the two embodiments described with reference to FIGS. 3 and 4.

With reference to FIG. 7, the gaseous effluent produced at the head of column RE is introduced through line 5 into heat exchanger E3 to be cooled, then into condenser C to be subcooled to the point of partial condensation. In tank B, the gaseous fraction is separated from the liquid fraction. The gaseous fraction, evacuated via line 6, constitutes the $CO_2$-rich fraction. The liquid fraction is introduced into heat exchanger E3 then into heat exchanger E4 before being introduced into the regeneration column RE as reflux. In exchanger E3, the reflux introduced into RE is heated by indirect heat exchange with the effluent coming from the head of RE. In exchanger E4, the reflux introduced into RE is heated by indirect heat exchange with the combustion fumes circulating in line 1.

FIG. 8 proposes to combine the two embodiments described with reference to FIGS. 2, 3, and 4.

With reference to FIG. 8, the gaseous effluent obtained at the head of RE is cooled to an intermediate temperature in C1, and the condensates produced by this cooling are recovered at the bottom of B1. The gaseous fraction evacuated at the head of B1 is cooled to a final temperature by E3 and C2, and the condensates produced by this second cooling are recovered at the bottom of B2. The condensates recovered at the bottom of B2 are heated in E3 by heat exchange with the gaseous fraction produced at the head of B1. These heated condensates are then combined with the condensates recovered at the bottom of B1. This condensate mixture is heated in exchanger E4 in order to be introduced into column RE as reflux via line 7. In exchanger E4, the reflux introduced into RE is heated by indirect heat exchange with the combustion fumes circulating in line 1. The gaseous fraction obtained at the head of B2 constitutes the $CO_2$-rich flow evacuated via line 6.

Without departing from the framework of the invention, other embodiments based on the combination of the various solutions presented in FIGS. 2 to 8 can be envisaged.

The numerical example presented below illustrates the present invention.

Let us consider a $CO_2$ capture process on the model of the process described with reference to FIG. 1, having the following characteristics:

fumes coming from a coal-fired electricity generating plant having 7% water, 13.5% $CO_2$, 75% nitrogen, and 4.5% oxygen, available at 30° C. and 103.3 kPa abs.

capture rate of $CO_2$ contained in fumes: 90% aqueous absorbent solution having 30 wt. % MEA reboiler R operates at 1.8 bars abs, with a reboiling temperature of 118° C., and a head temperature of 105° C., amine load in regenerated solution of 0.24 mol $CO_2$/mol MEA The table compares the amounts of heat required by column RE for the processes described with reference to FIGS. 1, 2, 3, 4, 6, and 8. Also, the table shows the influence of the various systems according to the invention on the reflux temperature generated at the head of column RE: the present invention reduces the energy consumption of reboiler R while maintaining the performance of absorbent solution regeneration.

| Process type | FIG. 1 | FIG. 2 | FIG. 3 | FIG. 4 | FIG. 6 | FIG. 8 |
|---|---|---|---|---|---|---|
| Reflux temperature (° C.) | 25 | 45.35 | 77.46 | 81.6 | 90.9 | 114 |
| Heat supplied by reboiler (MWth) | 405.5 | 389.6 | 386.1 | 386 | 385.5 | 380.2 |
| Energy consumption of reboiler per ton of $CO_2$ extracted (GJ/t of $CO_2$ extracted) | 3.47 | 3.34 | 3.315 | 3.31 | 3.305 | 3.26 |

The invention claimed is:

1. Method of capturing the $CO_2$ contained in combustion fumes wherein the following steps are carried out in combination:
    a) burning a fuel, producing combustion fumes;
    b) contacting cooled combustion fumes obtained in step e) with an absorbent solution in order to produce $CO_2$-poor fumes -and a $CO_2$-laden solution;
    c) regenerating the $CO_2$-laden solution in a thermal regeneration column in order to produce a regenerated absorbent solution and a $CO_2$-rich gaseous effluent;
    d) cooling the $CO_2$-rich gaseous effluent in order to obtain a $CO_2$-enriched gaseous fraction which is evacuated, and a liquid fraction
    e) heating the liquid fraction by heat exchange with the combustion fumes to form a heated liquid fraction and cooled combustion fumes; and
    f) introducing the heated liquid fraction at a head of the thermal regeneration column as reflux.

2. Method according to claim 1, wherein, in step d), said gaseous effluent is cooled to a temperature between 10° C. and 50° C.

3. Method according to claim 1, wherein heat is supplied at the bottom of the regeneration column by a reboiler.

4. Method according to claim 1, wherein the absorbent solution includes water and amines.

5. Method according to claim 1, wherein, before step b), the combustion fumes are cooled by indirect heat exchange with seawater.

6. Method according to claim 1, wherein the combustion fumes are produced by a thermal electricity generating plant, a steel blast furnace, a cement kiln, or a glass kiln.

7. Method according to claim 1, wherein, in step d), the $CO_2$-rich gaseous effluent is cooled to an intermediate temperature in order to produce a first liquid flow and a gaseous flow, then the gaseous flow is subcooled in order to produce the gaseous fraction and a second liquid flow, and the first liquid flow and the second liquid flow are reassembled to produce the liquid fraction.

8. Method according to claim 7, wherein, the intermediate temperature is between 40° C. and 80° C. and the gaseous flow is subcooled to a temperature between 10° C. and 50° C.

9. Method according to claim 7, wherein, in step d), the liquid fraction is heated by heat exchange with the $CO_2$-rich gaseous effluent.

10. Method according to claim 9, wherein, the intermediate temperature is between 40° C. and 80° C. and the gaseous flow is subcooled to a temperature between 10° C. and 50° C.

11. Method according to claim 1, wherein, in step d), the liquid fraction is heated by heat exchange with the $CO_2$-rich gaseous effluent.

* * * * *